United States Patent [19]
Doyle et al.

[11] Patent Number: 5,504,479
[45] Date of Patent: Apr. 2, 1996

[54] CARRIERLESS AMPLITUDE AND PHASE MODULATION TELEMENTRY FOR USE IN ELECTRIC WIRELINE WELL LOGGING

[75] Inventors: Mark R. Doyle, Houston; Fuling Liu, The Woodlands; Jorge O. Maxit, Houston, all of Tex.

[73] Assignee: Western Atlas International, Inc., Houston, Tex.

[21] Appl. No.: 473,441

[22] Filed: Jun. 7, 1995

[51] Int. Cl.$^6$ ............................................. G01V 1/00
[52] U.S. Cl. ............................................. 340/854.9
[58] Field of Search ............................ 340/853.1, 854.9, 340/855.2, 855.4, 855.5; 367/81

[56] References Cited

U.S. PATENT DOCUMENTS

| | | | |
|---|---|---|---|
| 4,891,641 | 1/1990 | Gard et al. | 340/854.9 |
| 5,387,907 | 2/1995 | Gardner et al. | 340/854.9 |

OTHER PUBLICATIONS

Contribution T1E1.4/90-154, Carrierless AM/PM, Sobrara et al., presented to the American National Standards Institute (ANSI) T1E1.4 Technical Sub–Committee Working Group, 1990.

*Primary Examiner*—Ian J. Lobo
*Attorney, Agent, or Firm*—Richard A. Fagin

[57] ABSTRACT

An apparatus for communicating signals from a well logging tool to a recording unit is disclosed. The logging tool includes a transmitter comprising a source of digital bits representing measurements made by the tool, an encoder connected to the source of digital bits for transforming groups of the digital bits into multivalued symbols, a first in-phase filter and a first quadrature filter connected to the encoder so that first coordinates of the symbols are filtered in the in-phase filter, second coordinates of the symbols are filtered in the quadrature filter, the filters having responses forming a Hilbert transform pair, a digital subtractor connected to the first filters for calculating a difference between outputs of the filters, and a digital-to-analog converter connected to the output of the subtractor for generating signals to be communicated to the recording unit over a communication channel.

The recording unit includes a receiver comprising an analog-to-digital converter to receive and digitize signals from the communication channel, a second in-phase filter and a second quadrature filter connected to the analog-to-digital converter, the second filters respectively having substantially the same response characteristics as the first in-phase and quadrature filters, a decision feedback equalizer connected to the second filters for correcting timing and distortion errors in the signals from the logging tool and demodulating the multivalued symbols, and a decoder connected to the equalizer for converting demodulated multivalued symbols output from the equalizer into the groups of bits conducted to the encoder in the logging tool.

28 Claims, 8 Drawing Sheets

CARRIERLESS AMPLITUDE AND PHASE MODULATION TELEMENTRY FOR USE IN ELECTRIC WIRELINE WELL LOGGING

BACKGROUND OF THE INVENTION

The present invention is related to the field of electric wireline well logging tools. More specifically, the present invention is related to systems for communicating signals from logging tools disposed in wellbores to a recording system located at the earth's surface.

Electric wireline well logging tools are used to make measurements of certain properties of earth formations penetrated by wellbores. The measurements can assist the wellbore operator in determining the presence, and quantity if present, of oil and gas within subterranean reservoirs located within the earth formations.

Well logging tools known in the art are typically extended into the wellbore at one end of an armored electrical cable. The cable can includes at least one, and commonly includes as many as seven, insulated electrical conductors surrounded by steel armor wires. The armor wires are included to provide abrasion resistance and tensile strength to the cable. The cable supplies electrical power to the logging tools and provides a communication channel for signals sent between the logging tools and a recording system usually located near the wellbore at the earth's surface.

Logging tools known in the art can provide many different types of measurements of the earth formation properties, including measurements of electrical resistivity, natural gamma-ray radiation intensity, bulk density, hydrogen nucleus concentration and acoustic travel time, among others. Still other logging tools, generally called "imaging" tools, provide finely detailed measurements, meaning successive measurements can be made at axial and radial spacings of as little as several hundredths of an inch, of resistivity and acoustic pulse-echo travel time in order to generate a graphic representation of the visual appearance of the wall of the wellbore.

It is known in the art to digitize the measurements, which is to convert the measurements made by each one of the logging tools into binary digital "words" composed of a plurality of digital bits, bits being signal levels representing numerical "ones" and "zeroes". Digital words can represent the numerical values of the measurements sampled at spaced apart time intervals. The measurements are then typically transmitted to the recording system as a series of digital bits arranged in a predetermined pattern. The significance of the predetermined pattern will be further explained.

It is generally beneficial to the wellbore operator to be able to combine as many different types of logging tools as is practical into one continuous instrument package (generally called a "tool string" by those skilled in the art). The benefit to the operator is to reduce the number of times logging tools must be extended into the wellbore, which can save a considerable amount of operating time. Combining a large number of measurements generally requires that large amounts of signal data be sent to the recording system at the earth's surface.

A particular problem in combining large numbers of measurements in the tool string is that the large amount of signal data which must be transmitted can cause the required signal data transmission rates to exceed the signal carrying capacity of the cable. This problem is particularly acute when the imaging tools are included in the tool string because of the very fine measurement spacing, and consequently the large increase in the amount of signal data, of imaging tools relative to other types of tools.

The cable may have limited signal transmission capacity because of the need for the cable not to exceed a practical external diameter, the need generally being for reasons related to safety of the wellbore and personnel near the wellbore. A practical limit for the diameter of seven conductor cables known in the art can be about 19/32 of an inch. Limited cable diameter provides cables generally having electrical properties which limit their frequency response to less than about 200,000 Hz (200 kHz). Frequency response can be observed in FIG. 1, which is a graphic representation of the frequency response (also referred to as a "transfer function") of a typical well logging cable.

It is known in the art to increase the effective signal data carrying capacity of the logging cable by encoding the binary digital signals using various types of encoding methods. The encoding methods constitute the previously described "predetermined pattern" of digital bits. Quadrature amplitude modulation ("QAM") telemetry can be used to transmit well logging data to the recording system, and one type of QAM telemetry system used for well logging tools is described, for example, in U.S. Pat. No. 5,387,907 issued to Gardner et al. QAM telemetry includes conversion of groups of digital bits ("bit groups") in the previously described predetermined pattern into 2-dimensional symbols, each comprising coordinates corresponding to the bit values in each bit group. The coordinates are converted to in-phase and quadrature analog signal amplitudes which are used to drive a specialized analog signal modulator. The modulator controls the output amplitude of a signal carrier generator. The modulated carrier is applied to the logging cable. Signal data are recovered in the recording system by extracting the amplitude values from the modulated carrier and reconverting them to digital bits.

A drawback to QAM when used in wireline well logging tool signal telemetry is that precise recovery of the data signal impressed onto the carrier requires a complex and expensive signal demodulator to precisely recover the amplitude and phase of the carrier. It can be impractical to provide such a demodulator for use in wireline recording systems.

It is known in the art to provide a data transmission scheme using a modulation system which does not employ a signal carrier. Such a modulation scheme is therefore not subject to performance degradation by error in carrier recovery, nor does it require a complex and expensive demodulator. A so-called carrierless amplitude and phase modulation ("CAP") system is described, for example, in "Contribution T1E1.4/90-154, Carrierless AM/PM", by Sobrara et al, as presented to American National Standards Institute (ANSI) T1E1.4 Technical Subcommittee Working Group, 1990. A drawback to the CAP system as described in the Sobrara et al reference is that the system was designed for use on the public telephone network, rather than for well logging applications. The system described in the Sobrara et al reference can have inadequate ability to compensate for changes in signal timing that can particularly occur in wireline signal telemetry because of changes in electrical signal transmission properties of the cable and in signal timing generator changes in the well logging tools. Timing generator changes in the tools and electrical property changes in the cable can result from variation in the ambient temperature of the cable and the electronics in the well logging tools, as they are extended into and withdrawn from the wellbore.

Accordingly, it is an object of the present invention to provide a CAP telemetry system for use in wireline well logging which can compensate for timing generator changes and electrical transmission property changes in the logging cable.

SUMMARY OF THE INVENTION

The present invention is an apparatus for communicating signals from a well logging tool to a recording unit. Part of the apparatus disposed in the logging tool includes a source of digital bits representing measurements made by the tool. The logging tool further includes an encoder connected to the source of digital bits for transforming groups of the digital bits into multivalued symbols, and a first in-phase filter and a first quadrature filter connected to the encoder. The first in-phase and quadrature filters have responses forming a Hilbert transform pair. The first in-phase filter filters first coordinates of the multivalued symbols and the first quadrature filter filters second coordinates of the multivalued symbols. A digital subtractor is connected to the first filters and calculates a difference between the outputs of the first filters. A digital-to-analog converter is connected to the output of the subtractor and generates signals to be communicated to the recording unit over a communication channel. In the preferred embodiment the communication channel can be an armored electrical well logging cable.

Part of the apparatus disposed in the recording unit includes an analog-to-digital converter which receives and digitizes the signals from the communication channel, and a second in-phase filter and a second quadrature filter connected to the analog-to-digital converter. The second filters, respectively, have substantially the same response characteristics as the first in-phase and quadrature filters. A decision feedback equalizer is connected to the second filters for correcting timing and distortion errors in the signals transmitted by the logging tool and demodulating the multivalued symbols, and a decoder is connected to the equalizer for converting demodulated multivalued symbols output from the equalizer into the groups of bits conducted to the encoder in the logging tool.

DESCRIPTION OF THE PREFERRED EMBODIMENT

The description of the preferred embodiment herein is divided into a system overview which describes major components of a wireline telemetry system. The description of the preferred embodiment then includes a detailed description of the functions performed by certain components of the system.

System Overview

Figure 2:
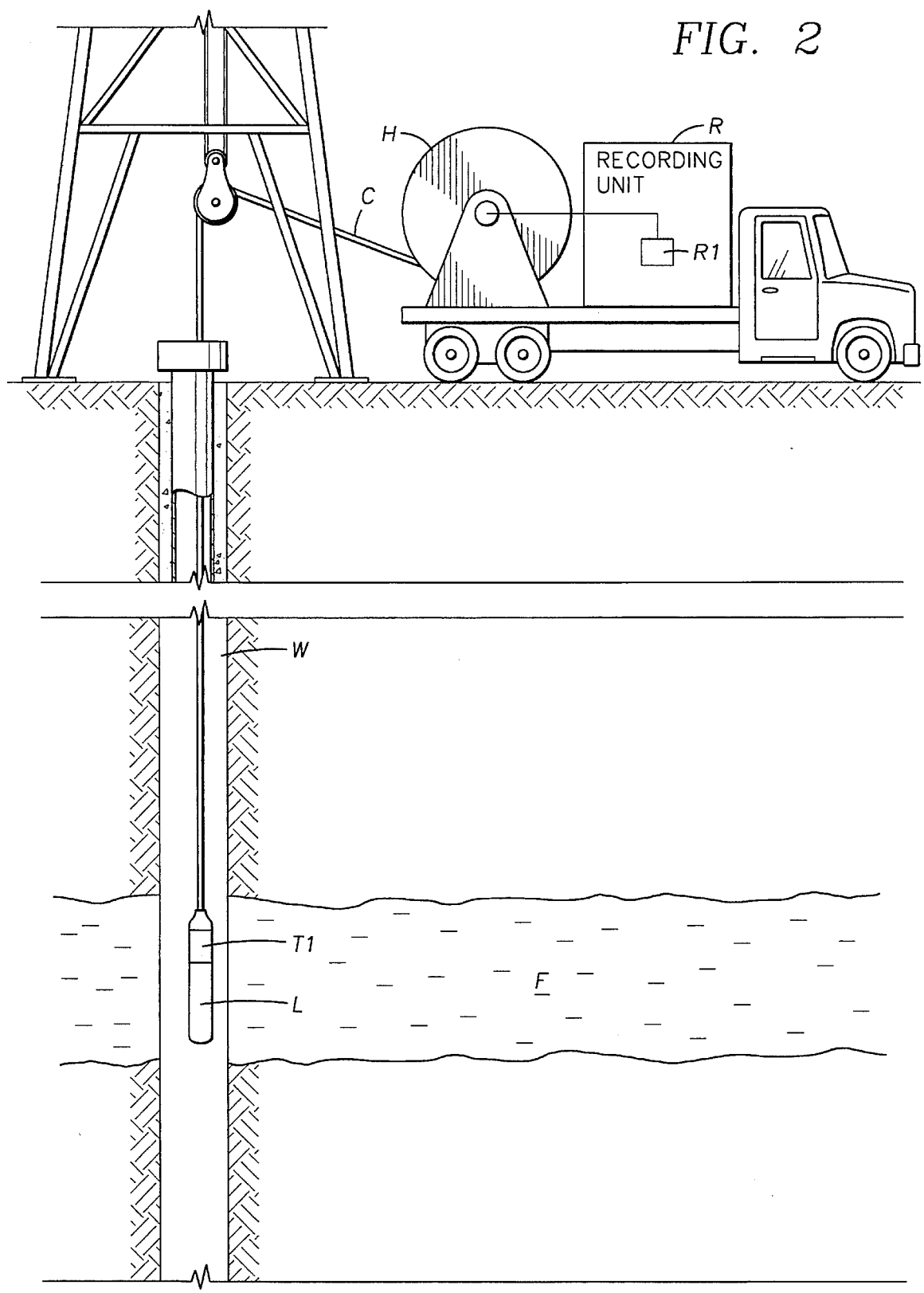
FIG. 2 shows a well logging tool having a telemetry system according to the present invention, the logging tool being lowered into a wellbore penetrating an earth formation.

Operation of a telemetry system according to the present invention can be better understood by referring to FIG. 2. A well logging tool L is lowered into a wellbore W penetrating an earth formation F. The logging tool L is attached to one end of an armored electrical cable C. The cable can be extended into the wellbore W by a hoist unit H, winch or similar device known in the art. The cable C is electrically connected to a recording unit R located at the earth's surface. The logging tool L can include a telemetry transmitter T1 according to the present invention for communicating signals generated by sensors (not shown) in the tool L. The signals typically correspond to various properties of the earth formation F. A telemetry receiver R1 can be disposed within the recording unit R to receive and decode the signals transmitted from the logging tool L. The decoded signals can be converted into measurements corresponding to properties of the earth formation F.

Figure 3:
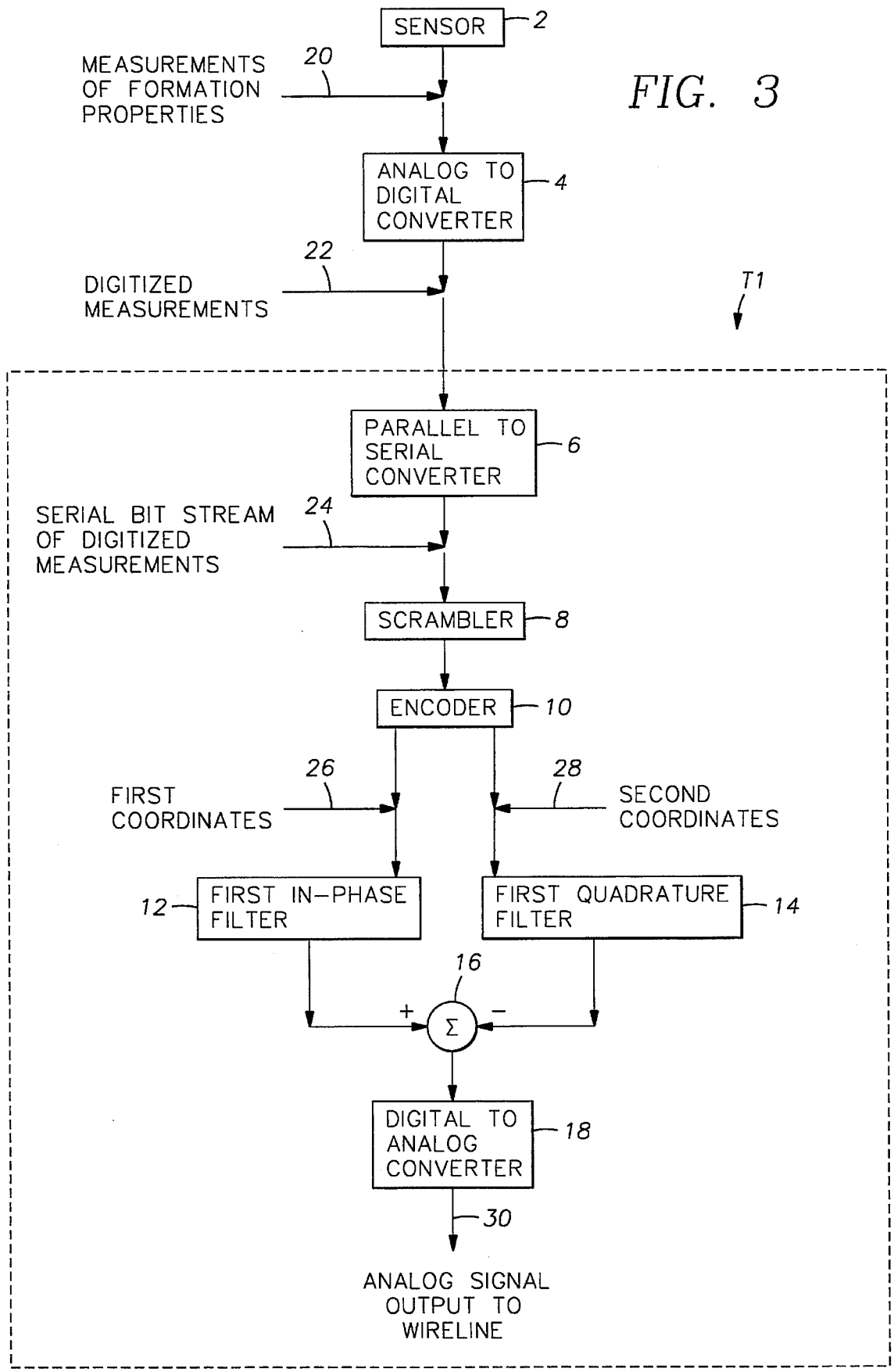
FIG. 3 shows a functional block diagram of the telemetry transmitter according to the present invention.
Figure 4:
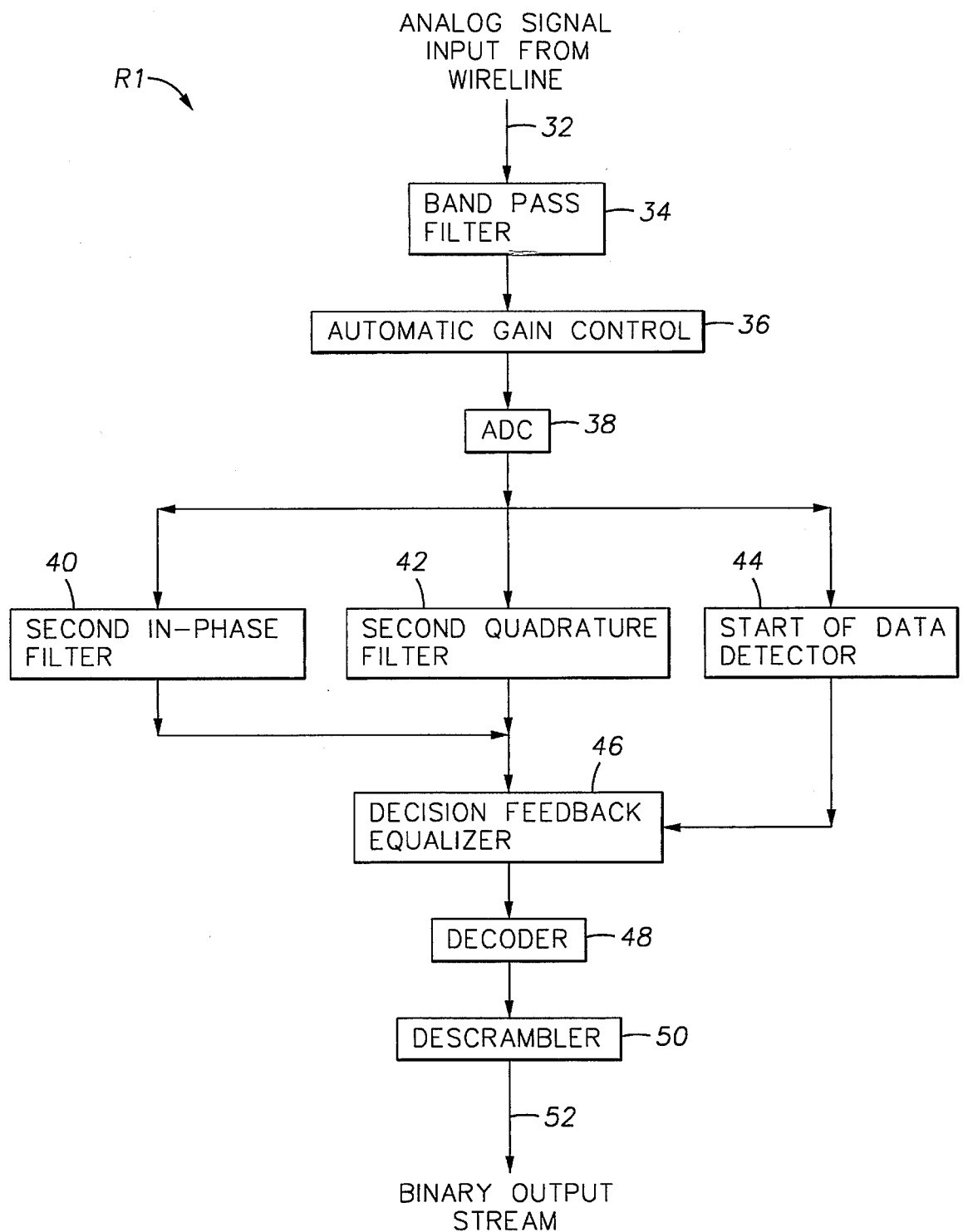
FIG. 4 shows a functional block diagram of a telemetry receiver according to the present invention.

The telemetry system according to the present invention can be better understood by referring to FIGS. 3 and 4. Referring first to FIG. 3, components typically disposed inside the well logging tool (shown as L in FIG. 2) for sending signals to the recording unit (shown in FIG. 2 as R) are shown generally as the transmitter T1.

The components disposed within the logging tool L can include one of the sensors shown at 2, which makes measurements shown generally at 20, of properties of an earth formation (shown as F in FIG. 2) from within a wellbore (shown as W in FIG. 2) in which the logging tool L is disposed. The type of sensor 2, and the property of the formation F which is measured by the sensor 2 should not be construed as a limitation on the present invention. It is to be understood that a description of the sensor 2 is included in the description of the preferred embodiment only to indicate a source of signals to be communicated to the recording unit R by the telemetry system of the present invention. As is understood by those skilled in the art, other measuring devices (not shown) disposed wholly within the logging tool (shown as L in FIG. 2) and providing measurements unrelated to the earth formation (shown as F in FIG. 2) can also provide measurements which can be communicated to the recording unit R by the telemetry system of the present invention.

The measurements 20 from the sensor 2 typically are conducted to a first analog-to-digital converter ("ADC") 4. The first ADC 4 generates digital words representing the magnitude of the measurements 20 sampled at spaced apart time intervals, called digitized measurements and shown generally at 22. Each digital measurement sample output from the first ADC 4 typically comprises a plurality of digital bits in a "parallel" format. The digitized measurements 22 can be conducted to a parallel-to-serial converter 6, which reformats the digitized measurements 22 composed of parallel bit words into a serial bit stream, as shown generally at 24.

The serial bit stream 24 is conducted to a scrambler 8 which reformats the serial bit stream into a bit stream comprising a substantially uncorrelated pattern of digital bits. The function and purpose of the scrambler 8 will be further explained in the detailed description of certain system components.

The uncorrelated pattern bit stream output from the scrambler 8 is conducted to an encoder 10. The encoder 10 sequentially samples equal quantities of bits from the output of the scrambler 8. The equal quantities are referred to as bit groups. The digital bits which are actually present within each bit group in the present embodiment can correspond to a 2-dimensional symbol programmed into the encoder 10. Each bit group input to the encoder results in an output from the encoder 10 comprising first, and second coordinates, the coordinates representing each symbol. The detailed function of the encoder 10 will be further explained.

The first coordinates output from the encoder 10, shown at 26 and corresponding to each bit group input to the encoder 10, are conducted to a first digital in-phase filter 12 at the rate at which the symbols are generated by the encoder 10. The second coordinates are similarly conducted to a first digital quadrature filter 14. The first filters 12, 14 in the present embodiment can be programmable-coefficient digital filters of a type known in the art. The first filters 12, 14 operate at a rate which is a multiple of the rate at which symbols are generated by the encoder 10. The inputs to the first filters 12, 14 are zero at all times other than the times at which symbols are conducted from the encoder 10. The functions and a description of certain characteristics of the coefficients of the first filters 12, 14 will be further explained.

The output of the first quadrature filter 14 is subtracted from the output of the first in-phase filter 12 in a first digital subtractor 16. The output of the first digital subtractor 16 is conducted to a digital to analog converter ("DAC") 18. The output of the DAC 18 comprises an analog signal which can be conducted to the cable (shown as C in FIG. 2) through an amplifier or line driver (not shown) of a type familiar to those skilled in the art. Alternatively, the output of the DAC 18 can be conducted through an analog low-pass filter (not shown) before application to the cable C in order to limit the amount of spurious high-frequency noise which may be imparted to the cable C from, among other sources, the discrete, step-like signal level changes associated with the output of the DAC 18.

The telemetry receiver R1 is shown in more detail in FIG. 4. The signal present on the cable C, which is generated by the DAC (shown in FIG. 3 as 18), is conducted to a bandpass filter 34. The bandpass filter 34 may be included in order to reject so-called "additive" noise which may be imparted to the cable C as is understood by those skilled in the art. Output of the bandpass filter 34 is conducted to an automatic gain control ("AGC") circuit 36. The AGC circuit 36 provides an output signal level which is substantially continuously within an input range of a second analog-to-digital converter ("ADC") 38. The second ADC 38 generates samples of the signal from the AGC 36 at spaced apart time intervals. The sample frequency of the second ADC 38 and the significance of that frequency will be further explained.

Output from the second ADC 38 is conducted both to a second in-phase filter 40 and a second quadrature filter 42, each of which has substantially the same response as its corresponding first filter (shown in FIG. 3 as 12 and 14) in the transmitter T1. Outputs from the second filters 40, 42 are conducted to a decision feed back equalizer 46. The feedback equalizer is also connected to a "start of data detector" 44, interconnected between the second ADC 38 output and the feedback equalizer 46. The function of the equalizer 46, as will be further explained, provides compensation for timing error in the signals from the transmitter T1 and for frequency selective attenuation (distortion) of signals sent along the cable C.

The output of the equalizer 46 represents the coordinates of the symbols generated by the encoder (shown as 10 in FIG. 3) in response to the values of the bits in the bit groups. The output of the equalizer 46 can be conducted to a decoder 48 which has programmed therein a cross-reference, which can be a look-up table, to correlate between the symbol coordinate values and the bit values within decoded bit groups having equal quantities of bits as the bit groups input to the encoder (shown in FIG. 3 as 10). The coordinates are therefore transformed in the decoder 48 to a serial bit stream substantially identical to the bit stream conducted to the encoder 10 within the transmitter T1. The bit stream representing the sensor (shown as 2 in FIG. 3) measurement values is reproduced by passing the decoder output through a descrambler 50, which is programmed to provide the inverse of the operation to the bit stream as is provided by the scrambler (shown as 8 in FIG. 3). Output from the descrambler 50 represents the same serial bit stream as the serial bit stream in the transmitter T1 corresponding to the digitized sensor measurements. The function of the descrambler 50 will be further explained.

DETAILED DESCRIPTION OF SYSTEM COMPONENTS

A system overview having been provided, a detailed description of the functions of certain components of the present invention will now be recited herein.

Referring back to FIG. 3, the function of the scrambler 8 will be explained in more detail. The serial bit stream 24 output from the parallel-to-serial converter 6 could comprise any possible sequence of digital "ones" and "zeroes" corresponding to the values of the measurements 20 input to the parallel-to-serial converter 6. However, components of the receiver (shown as R1 in FIG. 2) are designed to most easily decode bit streams which have substantially equal spectral amplitude over a wide range of frequencies, as is understood by those skilled in the art. Such frequency content is referred to as having a "white", or "flat", frequency spectrum. Some bit streams may not have a flat spectrum, for example, large numbers of successive "zeroes" or "ones" would have relatively high signal amplitude at a frequency corresponding to the rate at which the digital bits are generated. The scrambler 8 can comprise a programmable bit converter which changes the serial bit stream into a "scrambled" bit stream having a substantially flat spectrum. A description of a scrambler which will perform spectral "whitening" can be found, for example, in "Data Communication Over the Telephone Network", CCITT, Eighth Plenary Assembly, Red Book, Volume VIII, Fascile VIII.1, International Telecommunication Union, Geneva, 1985. The function of the scrambler in the CCITT reference is represented by the expression:

$$S(n)=B(n)\oplus S(n-18)\oplus S(n-23) \tag{1}$$

where the scrambled output bit S(n) is represented by the modulo 2 summation of the current input bit B(n) with the scrambled output delayed by 18 bits and with the scrambled output delayed by 23 bits. The output from the scrambler 8 comprises a scrambled bit stream having a "whitened" spectrum.

Figure 5:
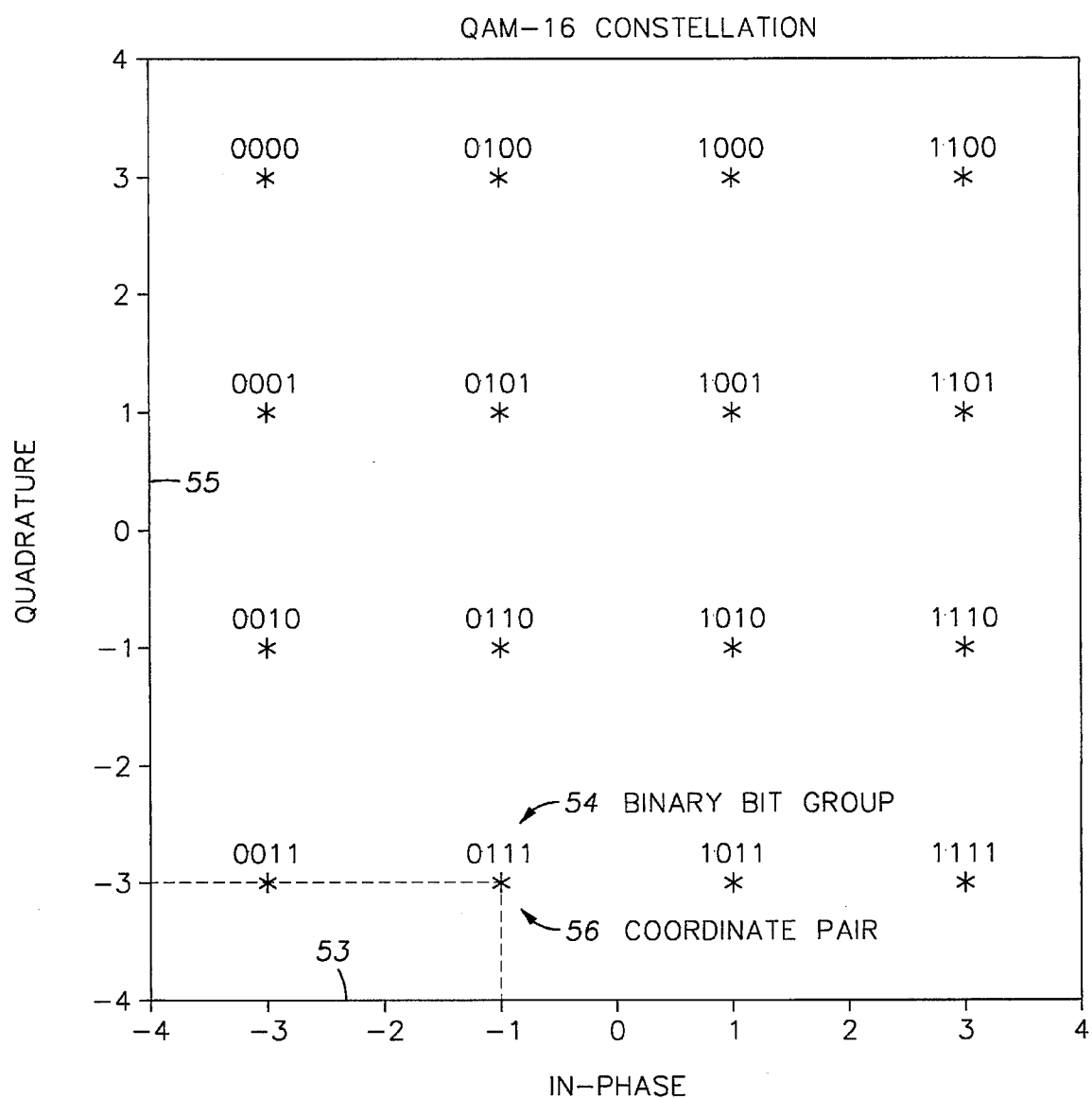
FIG. 5 shows a typical encoding constellation for a telemetry encoder according to the present invention.

The scrambled bit stream output from the scrambler 8 is conducted to the encoder 10 as previously described. The encoder 10 samples equal quantities of bits, the quantity of bits called $B_{sym}$, and generates a multivalued symbol corresponding to each group of bits. The symbols each have coordinates related in value to the individual bits in each bit group. A set of all possible symbols for each of the possible values of the bits in a group is called a constellation. A two-dimensional constellation can be used in the present invention for reasons which will be further explained. A typical two-dimensional constellation can be observed by referring to FIG. 5. The constellation shown in FIG. 5 can be similar to constellations used in quadrature amplitude modulation ("QAM") telemetry. QAM telemetry is known in the art and includes converting bit streams into multivalued symbols. A two-dimensional constellation having bit groups of four bits each will have sixteen possible symbol values. For example, a binary bit group having four bits, the bits being 0111, as shown at 54 in FIG. 5, can correspond to a symbol having a first coordinate value, shown on coordinate axis 53, of −1, and a second coordinate value, shown on axis 55, of −3. The symbol thus described is the two-dimensional ordered pair {−1, −3}.

As the scrambled bit groups are each encoded, the first coordinates 26 corresponding to each bit group are conducted to the previously described first in-phase filter 12, and the second coordinates 28 corresponding to each bit group are conducted to the first quadrature filter 14.

It is desirable to include encoding enhancements to the direct encoding of the bit groups as performed by the encoder 10 in order to correct errors which may occur due to imperfect transmission of signals to the recording unit (shown in FIG. 2 as R). For example, "Digital Communication", E. Lee and D. Messerschmitt, Kluwer Academic Publications, Boston, 1994, describes encoding enhancements which can be programmed into the encoder 10, such as error correction coding. Error correction coding includes calculating values for additional bits according to a predetermined formula depending on the values of the bits present in the bit stream input to the encoder 10. The additional bits thus determined can be included with the bit groups from which the multivalued symbols are generated in the encoder 10. Including additional error correction coding bits in the bit groups typically requires using larger symbol constellations in the encoder 10. The additional bits can be decoded in the decoder 48 in the receiver R1 to determine if the symbol thus decoded corresponds to a possible combination of bits in a bit group, or if not to indicate to the system operator that there have been transmission errors, as is understood by those skilled in the art.

It is desirable to use a two-dimensional encoder 10 because as previously described herein, the encoder 10 output is used to drive two filters, the first in-phase filter 12 and the first quadrature filter 14. The two filters 12, 14 are used in order to generate the telemetry signal which is ultimately applied to the cable C.

Figure 6A:
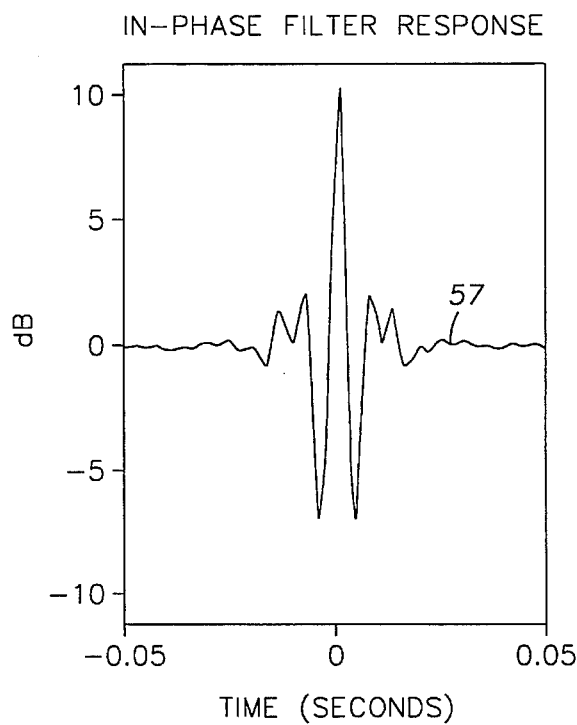
FIG. 6A shows the time response of an in-phase filter according to the present invention.
Figure 6B:
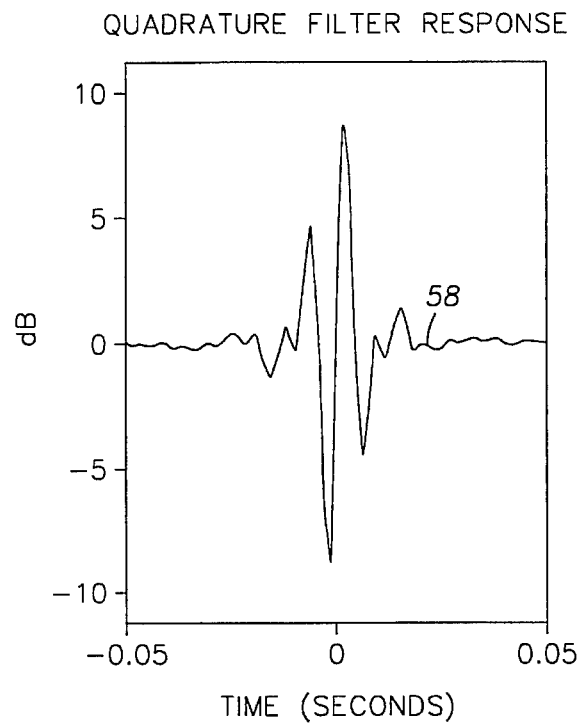
FIG. 6B shows the time response of a quadrature filter according to the present invention.
Figure 6C:
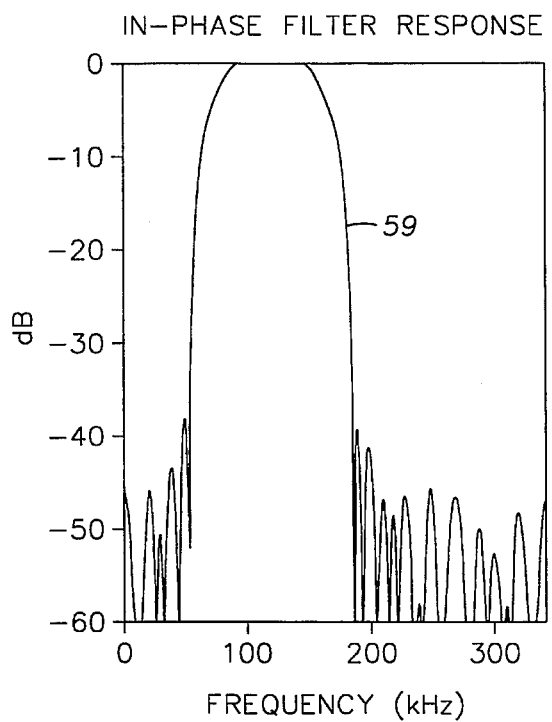
FIG. 6C shows the frequency response of an in-phase filter according to the present invention.
Figure 6D:
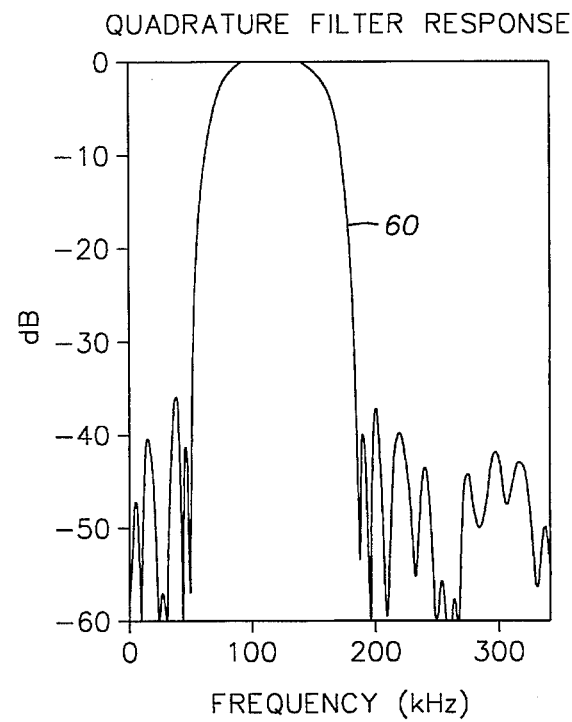
FIG. 6D shows the frequency response of a quadrature filter according to the present invention.

Certain properties of the first filters 12, 14 according to the present invention will now be described. As is understood by those skilled in the art, in order to use CAP modulation it is required that the first in-phase filter 12 and the first quadrature filter 14 have equal amplitude responses and have phase responses separated by a phase angle of 90 degrees. Such a relationship between the responses of two filters is referred to as a Hilbert transform pair. In the present embodiment of the invention, a Hilbert transform pair which can perform effectively can be described as a "square root raised cosine filter" pair. A time-domain filter response g(t) for a raised square root cosine filter can be described by the formula:

$$g(t)=\frac{4\alpha}{\pi\sqrt{T}}\ \frac{\cos(1+\alpha)\pi\frac{t}{T}+\frac{T}{4\alpha t}\sin(1-\alpha)\pi\frac{t}{T}}{1-\left(\frac{4\alpha t}{T}\right)^2} \tag{2}$$

where T is the baud interval, and $\alpha$ is a parameter called excess bandwidth. As is understood by those skilled in the art, the excess bandwidth is selectable by the system designer and is typically in the range of zero to one. Using a larger value of excess bandwidth requires a communication channel (which can be the cable C in the present invention) having a larger bandwidth, but enables a process called adaptive equalization to be more easily performed, and enables easier timing recovery in the receiver R1. The filter response in equation (2) occupies the frequency range between $-(1+\alpha)/2T$ and $(1+\alpha)/2T$. This frequency range comprises zero frequency and therefore cannot directly be used for a Hilbert transform pair. The filter response described in equation (2), however, can be directly converted into a useful Hilbert transform pair for the first in-phase 12 and first quadrature 14 filters according to the following expressions:

$$f(t)=g(t)\cos(2\pi f_c t) \tag{3}$$

the first in-phase filter 12 and:

$$f(t)=g(t)\sin(2\pi f_c t) \tag{4}$$

for the first quadrature filter 14, where $f_c$ is the center of the frequency passband of the first filters 12, 14. The filters described by equations (3) and (4) have a frequency passband in the range of $f_c-(1+\alpha)/2T$ to $f_c+(1+\alpha)/2T$. $f_c$ must be greater than $(1+\alpha)/2T$. Responses of the filters according to equations (3) and (4) can be observed by referring to FIGS. 6A through 6D. FIG. 6A shows a graphic representation of the filter response in the time domain for the first in-phase filter (12 in FIG. 3) as a curve at 57. FIG. 6B shows the time response for the first quadrature filter (14 in FIG. 3) as a curve at 58. Corresponding frequency-domain responses are shown as curves 59 in FIG. 6C and 60 in FIG. 6D. In FIGS. 6A through 6D the value of $\alpha$ equals 0.5, $f_c$ is 115 kHz, and T equals 12 microseconds.

The impulse responses of the filters as described in equations (3) and (4) must necessarily be of finite duration, as is understood by those skilled in the art. In the present embodiment of the invention, a filter impulse response duration for a time period of between four and eight baud intervals is preferred. The baud rate in the present invention is the rate at which symbols are output from the encoder (shown as 10 in FIG. 3), equivalent to the input bit rate divided by $B_{sym}$. The baud interval, therefore, is the time span between transmission of successive symbols.

The outputs from the first in-phase 12 and first quadrature 14 filters are, respectively, amplitude modulated representations of the in-phase, or first coordinates 26, and of the quadrature, or second coordinates 28 of the symbols. The first in-phase 12 and first quadrature 14 filter outputs are subtracted in the first digital subtractor (shown as 16 in FIG.

3). The first digital subtractor 16 generates a digital signal output which corresponds to the communication signal which is applied to the cable (shown as C in FIG. 2). The output of the first digital subtractor 16, which is referred to by the nomenclature CAP, can be described as:

$$CAP = \sum_i a_i f(t-iT) - \sum_i b_i \hat{f}(t-iT) \quad (5)$$

where i is the index number of the symbol set whose CAP value is currently output from the first digital subtractor 16.

As previously described, the output of the first digital subtractor 16 is applied to the digital-to-analog converter (shown as 18 in FIG. 3) which provides an analog signal to the cable C corresponding to the amplitude of the CAP value. The analog signal (shown generally as 30) is conducted to the receiver (shown as R1 in FIG. 2) over the cable C.

Referring again to FIG. 4, the analog signal from the cable C, shown at 32, is conducted to the bandpass filter 34 and the AGC circuit 36. It is to be understood that other circuits for maintaining a signal level suitable for input to the second ADC 38 can be used instead of the AGC 36, for example a fixed gain amplifier (not shown) or an adjustable gain amplifier (not shown) having gain adjustable by the system operator. The AGC 36 circuit output is conducted to the second ADC 38, which converts the analog signal into digital samples. The digital samples are generated at a rate referred to as $f_s$, which must be at least as much as the previously described baud rate. Preferably the digital sample rate is an integer multiple of the baud rate which is at least twice the highest frequency present in the signal on the cable:

$$f_s \geq 2\left(f_c + \frac{1+\alpha}{2T}\right) \quad (6)$$

so that, as will be further explained, a feed forward filter forming part of the decision feedback equalizer 46 can better compensate for timing and phase error which can be present in the signal 32 received from the cable C.

The digital samples from the second ADC 38 are conducted to the second in-phase filter 40 and second quadrature filter 42, which as previously explained can be substantially the same type, and have substantially the same response, as the respective first filters 12, 14 in the transmitter (shown in FIG. 3 as T1). The response of the second in-phase filter 40 is such that when sampled in synchronization with the baud rate its output is proportional to the magnitude of the in-phase component of the analog signal 32. Similarly, the output of the second quadrature filter 42 when sampled in synchronization with the baud rate is proportional to the magnitude of the quadrature component of the analog signal 32.

Figure 7:
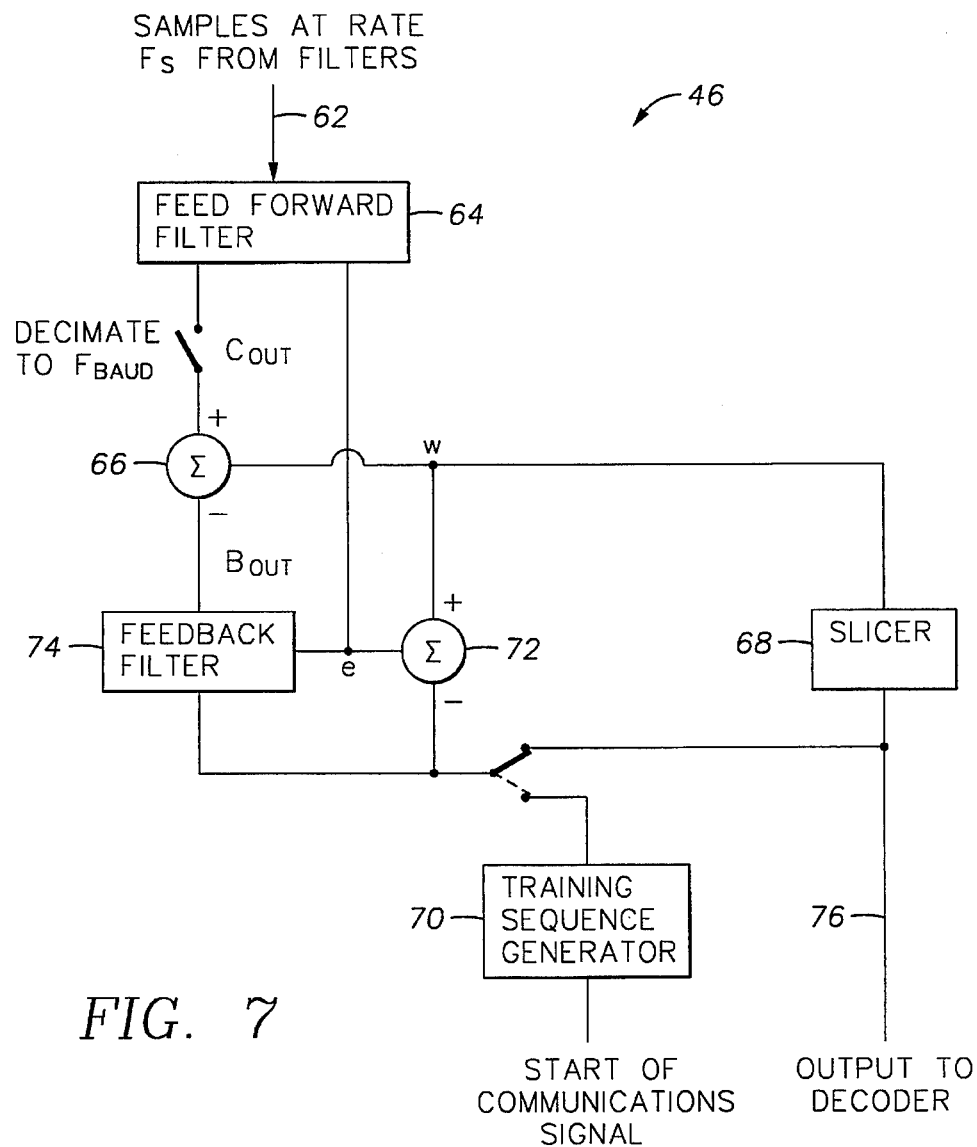
FIG. 7 shows a detailed functional block diagram of a decision feedback equalizer according to the present invention.

Referring now to FIG. 7, a description of the decision feedback equalizer 46 can be provided by using complex arithmetic and vector notation. Collectively, the output of the second in-phase (shown in FIG. 4 as 40) and the second quadrature (shown in FIG. 4 as 42) filters can be considered as a complex data stream. This complex data stream can be represented by the expression:

complex=in-phase+j * quadrature where j is the square root of −1. A feed forward filter 64 in the equalizer 46 can be a transversal or tapped delay line filter of a type known in the art. The feed forward filter 64 can have a number of filter taps represented by $Taps_c$. Output from the second in-phase 40 and second quadrature 42 filters is conducted to the feed forward filter 64. The output of the feed forward filter 64, designated $C_{out}$, can be represented by the vector inner product of: the complex input element vector r of the signal elements in the filter 64 delay line (not shown separately); and the filter 64 coefficient vector c. The vector inner product can be represented by the following expression:

$$C_{out} = r \cdot c \quad (7)$$

Digital samples output from the second in-phase 40 and second quadrature 42 filters are shifted into the feed forward filter 64 at the digital sample rate $f_s$. However, only the sample value corresponding to the time of transmission of a CAP symbol signal, this time being called $t_0$, needs to be determined in order to resolve the coordinate values of the instant symbol which was transmitted. Therefore, the output of the filter 64 need only be calculated at the baud rate, a process referred to as decimation. As previously stated herein, it is preferable that the digital sample rate of the ADC 38 be an integral multiple of the baud rate to facilitate decimation of samples output from the feed forward filter 64. It is also preferable that the number of taps $Taps_c$ be sufficient so that the equivalent time duration of the samples in the feed forward filter 64 delay line (which is $Taps_c/f_s$) be longer than any probable error in estimation of $t_0$ in order for the feed forward filter 64 to be able to correct for the timing error.

The output of the feed forward filter 64 is eventually conducted to a slicer 68. The slicer 68 is a multi-valued threshold operator, and can be of a type known in the art. The slicer 68 compares its input, referred to as w and directed from the feed forward filter 64, against the possible symbol values of the constellation as programmed into the encoder (shown as 10 in FIG. 3). The slicer 68 generates output values, referred to as d, which are equal in magnitude to the symbol coordinate values (from the constellation) which are closest in magnitude to the magnitude of the input values. For example, if the symbol constellation includes the coordinate values {−3, −1, 1, 3} and the input from the feed forward filter 64 equals −2.4+3.1j, then the slicer 68 would generate an output symbol of {−3, 3}.

Because of timing errors and signal distortion caused by the cable (shown in FIG. 2 as C), the input to the slicer 68 typically will not match the symbol values in the constellation. In a novel aspect of the present invention, the values input to the slicer 68 are compared with the values in the symbol constellation to determine information about the timing error and signal distortion which can be caused by the cable C. The information about the distortion and timing error thus determined can be used to modify coefficients in the feed forward filter 64 to minimize the error and distortion. The output of the slicer 68, previously referred to as d, and the input w to the slicer 68 are compared in a second digital subtractor, shown at 72. The output of the second digital subtractor 72 represents an error signal, referred to as e, which can be minimized by techniques known in the art such as least mean square ("LMS") error minimization. LMS error minimization can be represented by the following expression:

$$c\,(k+1) = c\,(k) - \Delta_c\, e(k)\, \bar{r}(k) \quad (8)$$

where c(k+1) is the k+1-th set of filter coefficients in the feed forward filter 64, $\Delta_c$ is a real constant affecting the convergence rate of the feed forward filter 64, e is the complex slicer error, shown as (w−d), and the overbar r represents the complex conjugate of r.

Methods are known in the art for selecting $\Delta_c$, a typical method being represented by the expression:

$$\Delta_c \approx \frac{1}{Taps_c P} \qquad (9)$$

where P represents the signal power in the input of the feed forward filter 64.

When data transmission is first begun, the output of the slicer 68 will not represent the symbol which was actually transmitted. Correct adaptation of the feed forward filter 64 will therefore be affected. In another novel aspect of the present invention, the initial adaptation of the feed forward filter 64 can be controlled by directing input of a sequence of known symbols, referred to as a training set, into the second digital subtractor 72 in substitution of the output of the slicer 68. The training set can be generated by a training set generator shown at 70. After transmission of the training set is completed, adaptation of the feed forward filter 64 proceeds as previously described herein. The beginning of communication from the transmitter (shown as T1 in FIG. 2) can be determined by a threshold detector (not shown), or a start of data detector shown as 44 in FIG. 4, either of which can respond to changes in average power output from the ADC (shown as 38 in FIG. 4). Either system is relatively insensitive to noise having short duration ("bursts").

Another novel aspect of the present invention is the inclusion of a feedback filter, shown in FIG. 7 as 74 as part of the decision feedback equalizer 46. The feedback filter 74 can be a transversal delay line filter of a type known in the art. The feedback filter 74 stores the output of the slicer 68 (or the training set during start-up) and generates an output according to the following expression:

$$B_{out} = b \cdot d \qquad (10)$$

where d, as previously explained, is the output of the slicer 68 and b is the complex vector representing the coefficients of the feedback filter 74. The number of coefficients of the feedback filter 74 can be represented by $Taps_b$. The input to the slicer 68 can be modified in a third digital subtractor 66 interconnected between the feed forward filter 64 and the slicer 68 to represent the difference between the output of the feed forward filter 64 and the feedback filter 74.

The coefficients of the feedback filter 74 can be adaptively modified by an error minimization routine similar to the error minimization used to adapt the coefficients of the feed forward filter 64. A typical expression or the adaptation of the feedback filter 74 is:

$$b(k+1) = b(k) + \Delta_b \, e(k) \, \bar{d}(k) \qquad (11)$$

where $\Delta_b$ is the real convergence constant, which can be determined in a manner similar to the manner used to determine the constant ($\Delta_c$) for the feed forward filter 64.

It is to be understood that the inclusion of the feedback filter 74 is an optional enhancement to the system of the present invention. The system of the present invention will perform the stated object of the invention, which is to provide CAP telemetry which can compensate for timing changes and variable communication channel distortion, without the use of the feedback filter 74.

Symbols which are output from the slicer 68 can be conducted to the decoder (shown as 48 in FIG. 4) wherein the symbols are converted to a substantially identical bit stream as was conducted to the encoder (shown as 10 in FIG. 3). The bit stream output from the decoder 48 must further be unscrambled to provide the original serial bit stream representing the sensor measurements (shown at 20 in FIG. 3). Unscrambling can be performed in the descrambler (shown in FIG. 4 at 50), which applies the inverse operation to the bit stream that the scrambler 8 does in the transmitter T1.

DESCRIPTION OF ALTERNATIVE EMBODIMENTS

In the first embodiment of the invention, the feed forward filter (shown as 64 in FIG. 7 must necessarily have a finite number of taps. As the amount of distortion imparted by the cable (shown as C in FIG. 2) to the signal from the transmitter (shown as T1 in FIG. 2) increases, it can become necessary to provide the feed forward filter 64 with an increasing number of taps to correct for the distortion. However, cables known in the art typically impart distortion to a signal which is similar in frequency response to the transfer function shown in FIG. 1. The wireline transfer function shown in FIG. 1 can be mathematically modelled as a function of frequency (f) by the expression:

$$H(f) = 10^{-mf} \qquad (12)$$

where m is a constant related to the length and construction of the cable C. A linear phase shift factor related to the time delay in propagating a signal along the cable C has been omitted from equation (12). It is possible to improve the performance of the decision feedback equalizer (shown as 46 in FIG. 7) by including an inverse filter (not shown) providing the inverse response of the transfer function model shown in equation (12). It is preferred to provide such an inverse filter (not shown) interconnected between the outputs of the second in-phase (shown as 40 in FIG. 4), the second quadrature (shown as 40 in FIG. 4) filters and the input to the equalizer 46. The position of the interconnection of the inverse filter (not shown) should not be construed as a strict limitation of the invention. As is understood by those skilled in the art, other interconnection positions of the inverse filter, such as at the output of the second ADC (shown as 38 in FIG. 4), can also provide the desired filter performance.

Yet another embodiment of the invention provides a pilot tone in the transmitted signal to improve the performance of the feed forward filter (shown as 64 in FIG. 7). The first embodiment of the invention provides that the baud rate of the transmitter T1 is close enough to the baud rate generated in the receiver R1 so that the optimum sampling point, previously described as $t_0$, does not drift in time beyond the capacity of the feed forward filter 64 to correct. In order to reduce the possibility of this occurrence, the sampling rate of the second ADC (shown as 38 in FIG. 4) can be controlled by an external clock signal. The external clock signal can be generated by a phase locked loop. A typical phase locked loop system can be observed by referring to FIG. 8. The communication signal input to the ADC 38 from the AGC (shown as 36 in FIG. 4) is also conducted to a bandpass filter 78. The communication signal generated in the transmitter T1 can include a sinusoidal pilot tone which is impressed onto it. The pilot tone can be generated by a local oscillator or clock (not shown) which drives the digital-to-analog converter (shown as 18 in FIG. 3). The frequency of the pilot tone is preferably a multiple of the baud rate which is selected by the system designer so that the pilot tone will not occupy the same bandwidth as the communication signal. The output of the bandpass filter 78 represents the pilot tone, and this output is conducted to a phase locked loop including a multiplier 80, a low-pass filter 82 connected to the output of the multiplier 84, a loop filter 84, and a voltage controlled oscillator 86. The components of the phase locked loop as recited herein are well known in the art and can provide a clock signal output which is maintained substantially at the frequency of the pilot tone. Phase locked loops which will perform the required maintenance of the clock signal frequency can be found or example in "Phase Locked Loops", A. Blanchard, Wiley, 1976. The phase locked loop provides adjustment to the rate and phase at which the incoming communication signal is sampled so that the ADC 38 sampling rate substantially matches the signal transmission rate.

Figure 8:
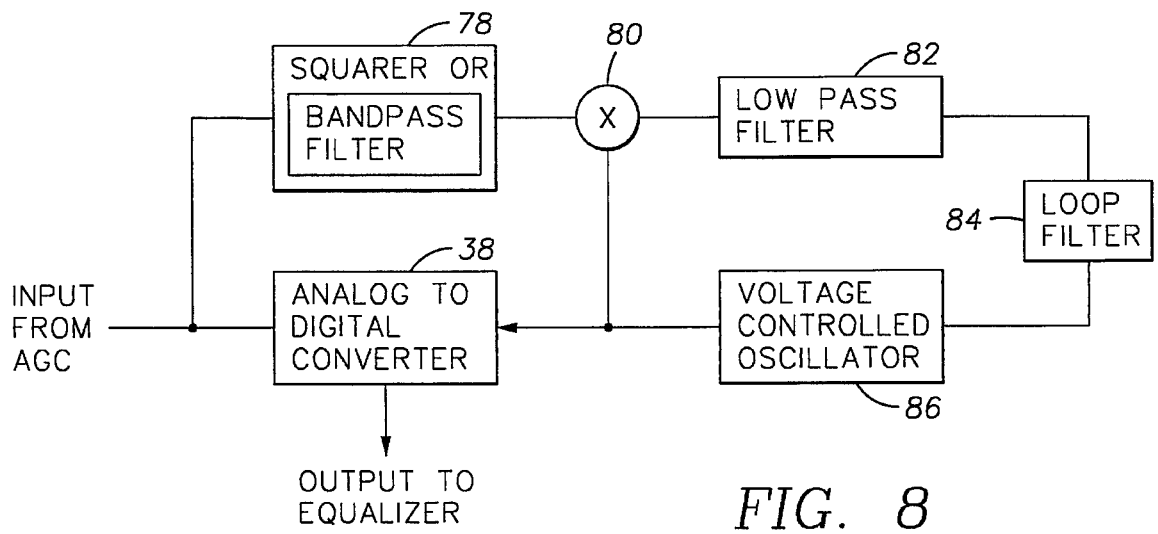
FIG. 8 shows a system for extracting a timing signal from a transmitted telemetry signal.
Figure 9A:
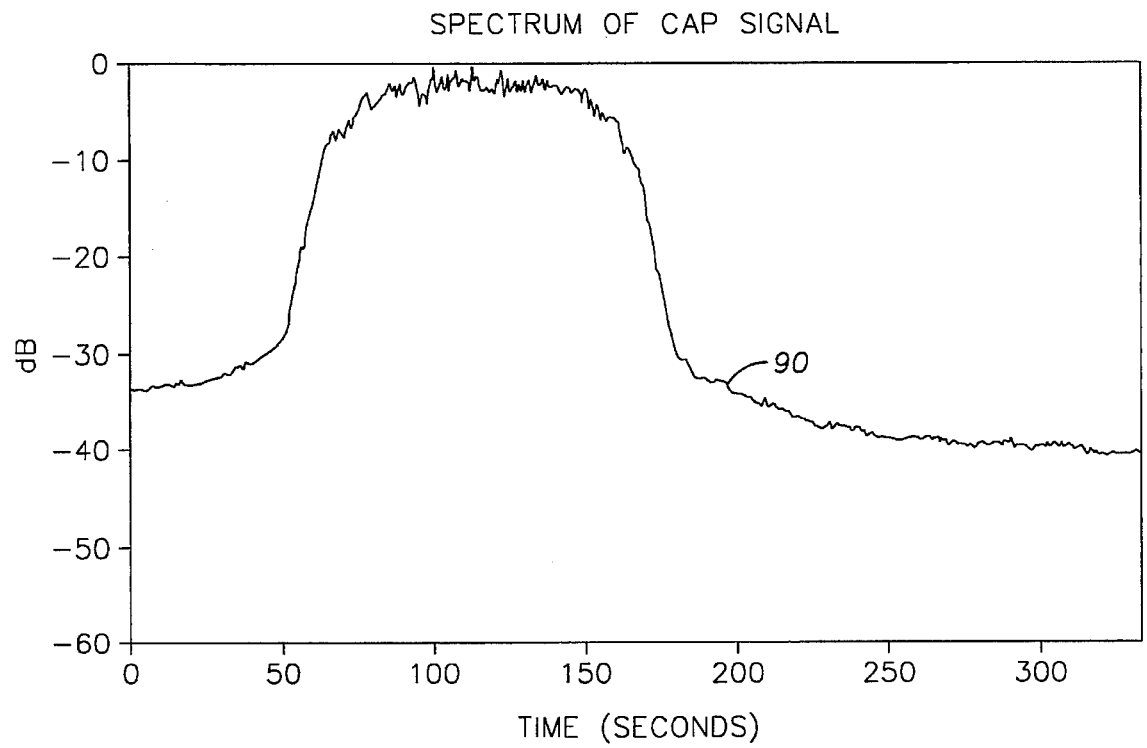
FIG. 9A shows a spectrum of the CAP signal before squaring.
Figure 9B:
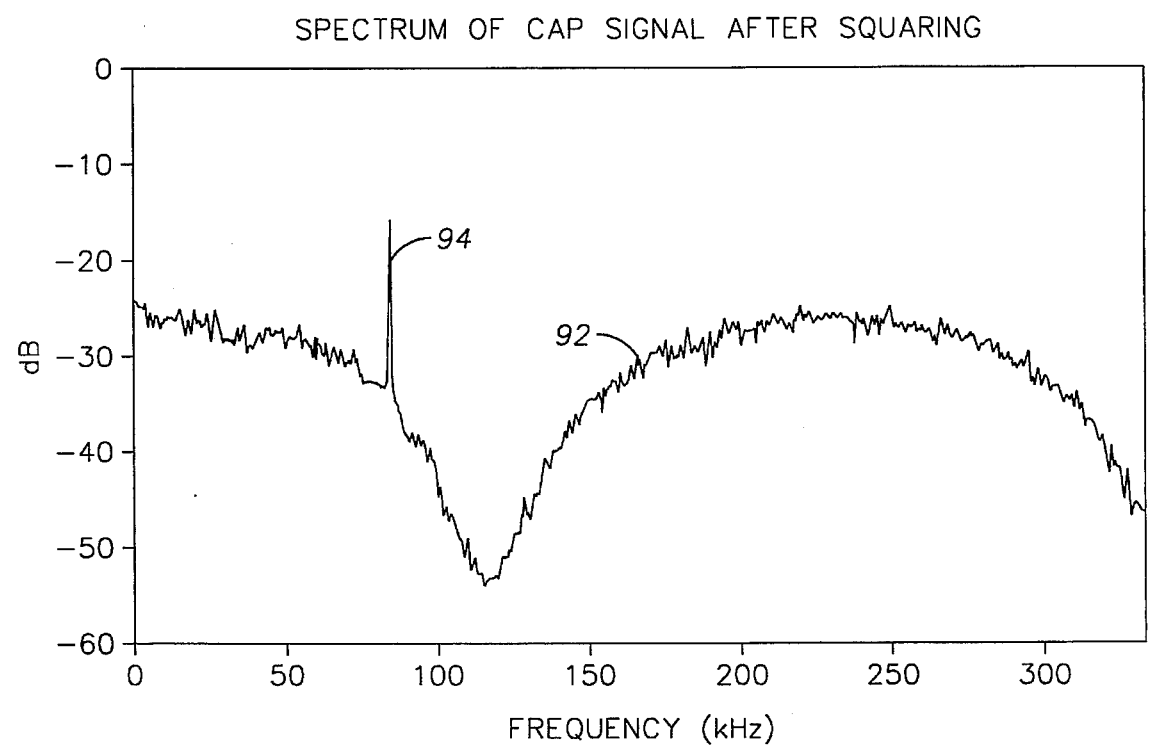
FIG. 9B shows a spectrum of the CAP signal after squaring.

In a modification of the embodiment of the invention including the phase locked loop apparatus, the need for the pilot tone can be eliminated by conducting the incoming communication signal through a non-linear function operator such as a "squarer", also shown in FIG. 8 as 78. The squarer 78 multiplies values of the incoming communication signal by themselves. A tone inherent in the communication signal which has a frequency substantially equal to the baud rate can be extracted from the communication signal by the squarer 78. The phase locked loop can then maintain its clock signal output at the baud rate. An example of extracting the baud rate tone from the communication signal by squaring is shown in FIGS. 9A and 9B. The spectrum of the communication signal is shown in FIG. 9A as a curve at 90. The spectrum after squaring is shown generally at 92 in FIG. 9B. The squared spectrum clearly exhibits a tone at the baud rate, as shown at 94 in FIG. 9B.

Figure 1:
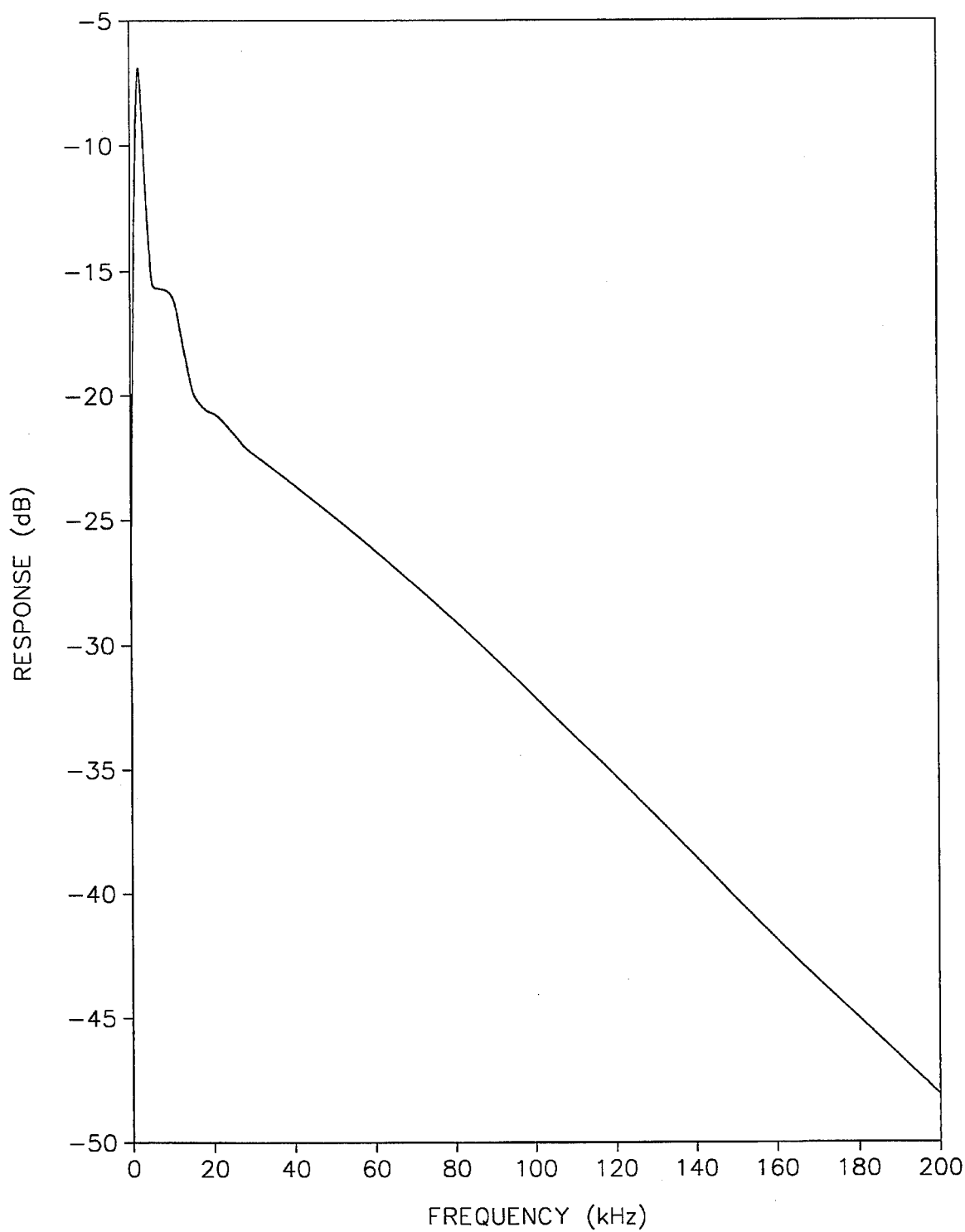
FIG. 1 shows a graphic representation of the frequency response of a typical well logging cable.

In still another embodiment of the invention, the performance of the telemetry system may be further improved by inclusion of Tomlinson encoding in the encoder (shown as 10 in FIG. 3). As previously explained, the scrambler (shown as 8 in FIG. 3) provides a bit stream which has a whitened spectrum. The spectrum of signals which have passed through the cable (shown as C in FIG. 2) will typically be attenuated according to the transfer function as shown in FIG. 1. Tomlinson encoding is known in the art and provides further encoding of the bit stream in such a manner so as to selectively increase the spectral amplitudes of the higher frequency components of the spectrum of the bit stream. The purpose of Tomlinson encoding is to counteract the effects of the transfer function of the cable C. The Tomlinson encoding can be provided as an instruction set to the encoder 10.

Another embodiment of the invention includes trellis encoding of the bit stream output from the scrambler 8 prior to symbol generation in the encoder 10. Trellis encoding is known in the art and typically provides an additional bit to each bit group. The value of the additional bit is selected so that the symbol which will be generated by the encoder 10 will be different, within a predetermined pattern in the symbol constellation, from the previous symbol generated by the encoder 10 in response to the previous bit group. Trellis encoding provides that successive symbols occur within the predetermined pattern to increase the reliability of symbol determination in the receiver (shown as R1 in FIG. 4). Trellis encoding can be included by providing an appropriate instruction set to the encoder 10, as is understood by those skilled in the art. Use of trellis encoding, as is also understood by those skilled in the art, typically requires the use of a so-called "Viterbi" algorithm in the decoder (shown as 48 in FIG. 4) to determine that successive symbols occur within the predetermined pattern. The Viterbi algorithm can be an instruction set forming part of the programming of the decoder (shown as 48 in FIG. 4).

It is to be explicitly understood that the while the components of the transmitter (shown in FIG. 3 as T1) are described as being disposed within the logging tool (L in FIG. 2), and the components of the receiver (shown in FIG. 4 as R1) are described as being disposed within the recording unit (R in FIG. 2), the system of the present invention can perform the function of transmitting signals from the recording unit R to the logging tool L by including an additional transmitter (not shown) in the recording unit R and an additional receiver (not shown) in the tool L. Sending signals from the recording unit R to the tool L can be used, for example to control operating functions within the tool L such as which sensor (such as 2 in FIG. 3) can have its measurements included in the signal transmitted to the recording unit R.

Those skilled in the art will be able to devise modifications and improvements to the system disclosed herein without departing from the spirit of the invention. The invention should be limited in scope only by the claims appended hereto:

What is claimed is:

1. An apparatus for communicating signals from a well logging tool to a recording unit, comprising:

a source of digital bits disposed within said logging tool, said source for generating digital representations of measurements made by sensors in said logging tool;

an encoder disposed within said logging tool and connected to said source, said encoder for transforming groups of bits output from said source into multivalued symbols having first coordinates and second coordinates;

a first in-phase filter disposed within said logging tool and connected to said encoder so as to generate a filtered output of said first coordinates;

a first quadrature filter disposed within said logging tool connected to said encoder so as to generate a filtered output of said second coordinates, said first in-phase and said first quadrature filters comprising a Hilbert transform pair;

a subtractor disposed within said logging tool and connected to outputs of said first filters for calculating a difference between said outputs of said in-phase and said quadrature filters;

a digital-to-analog converter disposed within said logging tool and connected to an output of said subtractor, said converter for generating said signals to be communicated to said recording unit over a communication channel;

an analog-to-digital converter disposed within said recording unit for receiving and digitizing said signals from said communication channel;

a second in-phase filter disposed within said recording unit and connected to said analog-to-digital converter;

a second quadrature filter disposed within said recording unit and connected to said analog-to-digital converter, said second in-phase and said second quadrature filters having substantially the same response characteristics respectively as said first in-phase and said first quadrature filters;

a decision feedback equalizer disposed in said recording unit and connected to outputs of said second filters, said equalizer for correcting timing and distortion errors in transmission of said signals from said logging tool to said recording unit, said equalizer for recovering said multivalued symbols from output of said second filters; and a decoder disposed within said recording unit and connected to said equalizer, said decoder for converting said recovered multivalued symbols from said equalizer into said groups of bits conducted to said encoder in said logging tool.

2. The apparatus as defined in claim 1 further comprising: a scrambler interconnected between said source of digital bits and said encoder, said scrambler providing a scrambled bit stream having a whitened spectrum; and a descrambler connected to said decoder for converting groups of scrambled bits output from said decoder into bits substantially identical to bits output from said source of digital bits.

3. The apparatus as defined in claim 1 further comprising: an error correction encoder interconnected between said source of digital bits and said encoder, said error correction encoder providing additional digital bits conducted to said encoder, said additional bits determined according a predetermined format corresponding to digital bits output from said source of digital bits; and an error correction decoder connected to said decoder for determining that said bits output from said decoder include said digital bits and said additional bits according to said predetermined format.

4. The apparatus as defined in claim 3 wherein said predetermined format comprises trellis encoding.

5. The apparatus as defined in claim 4 wherein said error correction decoder comprises a Viterbi decoder.

6. The apparatus as defined in claim 1 wherein said encoder further comprises a Tomlinson encoder for compensating signal distortion impressed on said signals by said communication channel.

7. The apparatus as defined in claim 1 further comprising a bandpass filter and an automatic gain control circuit interconnected between said communication channel and said analog-to-digital converter.

8. The apparatus as defined in claim 1 further comprising a phase locked loop providing a clock input to said analog-to-digital converter, said phase locked loop adapted to maintain a frequency substantially equal to a frequency of a pilot tone impressed onto said signals to be communicated.

9. The apparatus as defined in claim 1 further comprising a phase locked loop providing a clock input to said analog-to-digital converter, said phase locked loop including a non-linear function operator interconnected between an input of said analog-to-digital converter and a multiplier in said phase locked loop, said phase locked loop adapted to extract a tone inherent in said signals.

10. The apparatus as defined in claim 9 wherein said non linear function operator comprises a squarer.

11. A telemetry system for transmitting signals along a cable connecting a wireline well logging tool to a recording unit, comprising:
a carrierless amplitude and phase modulation transmitter connected to one end of said cable; and
a carrierless amplitude and phase modulation receiver connected to the other end of said cable and adapted to receive signals from said transmitter, said receiver including a decision feedback equalizer interconnected between in-phase and quadrature filters, and a symbol decoder forming part of said receiver, said decision feedback equalizer including a feed forward filter connected to said in-phase and quadrature filters, said equalizer including a slicer connected to an output of said feed forward filter through a first subtractor adapted to calculate a difference between an output of said slicer and an output of said feed forward filter, said equalizer including means for adjusting response of said feed forward filter so as to minimize said difference output from said first subtractor.

12. The telemetry system as defined in claim 11 wherein said equalizer further comprises a feedback filter interconnected between an output of said decoder and a second subtractor, said feedback filter including means responsive to a difference between an input and an output of said slice so as to adjust a response of said feedback filter to minimize said difference in said input and said output of said slicer.

13. The telemetry system as defined in claim 11 further comprising an inverse filter interconnected between said equalizer and said in-phase and quadrature filters, said inverse filter adapted to correct distortion imparted to signals transmitted by said transmitter by said cable.

14. The telemetry system as defined in claim 11 further comprising a phase locked loop for synchronizing an operating frequency of said receiver with a pilot tone impressed onto said signals from said transmitter, said pilot tone having a frequency functionally related to an operating frequency of said transmitter.

15. The telemetry system as defined in claim 11 further comprising a phase locked loop for synchronizing said receiver to said transmitter, said phase locked loop including a non-linear function operator for extracting a tone inherent in said signals from said transmitter.

16. The telemetry system as defined in claim 15 wherein said non-linear function operator comprises a squarer.

17. A method of communicating binary digital signals from a well logging tool to a recording unit comprising:
encoding said binary digital signals into multivalued symbols having first and second coordinates, said step of encoding performed at a symbol rate;
filtering said first coordinates in a first filter;
filtering said second coordinates in a second filter, said first filter and said second filter forming a Hilbert transform pair;
calculating a difference in output of said first and said second filters;
converting said difference into an analog signal;
transmitting said analog signal from said logging tool to said recording unit;
digitizing said analog signal in said recording unit;
applying said digitized signal to third and fourth filters, said third and said fourth filters forming a Hilbert transform pair;
recovering said first coordinates and said second coordinates by sampling outputs of said third and said fourth filters at said symbol rate; and
decoding said first and second coordinates to recover said binary digital signals.

18. The method as defined in claim 17 further comprising scrambling said binary digital signals prior to said step of encoding said binary digital signals to whiten a spectrum of said binary digital signals, and descrambling after said step of decoding to recover said binary digital signals.

19. The method as defined in claim 17 wherein said step of encoding further comprises error correction coding.

20. The method as defined in claim 19 wherein said step of error correction coding comprises trellis encoding.

21. The method as defined in claim 20 wherein said step of decoding to recover said binary digital signals further comprising Viterbi decoding.

22. The method as defined in claim 17 further comprising the step of adaptively filtering prior to said step of recovering said first and said second coordinates, said step of adaptively filtering including directing output of said third and said fourth filters to a feed forward filter, comparing said output of said feed forward filter to values of said first and said second coordinates, and adjusting a response of said feed forward filter to minimize a first difference between said coordinates and said output of said third and fourth filters.

23. The method as defined in claim 22 further comprising the step of adjusting an output of said feed forward filter prior to said step of recovering said coordinates, said step of adjusting including applying said coordinates to a feed back filter, determining a second difference by subtracting an output of said feedback filter from said output of said feed forward filter, and adjusting the response of said feedback filter to minimize said second difference.

24. The method as defined in claim 17 further comprising the step of inverse filtering prior to said step of recovering said coordinates, said step of inverse filtering providing correction to said analog signal for distortion imparted to said signal by a communication channel during said step of transmitting.

25. The method as defined in claim 17 wherein said step of encoding further comprises Tomlinson encoding to compensate for a transfer function of a communication channel linking said logging tool to said recording unit.

26. The method as defined in claim 17 further comprising the step of synchronizing said step of digitizing said analog signal with said step of encoding said binary digital signals by impressing a pilot tone onto said analog signal, said pilot tone having a frequency functionally related to a rate at which said step of converting is performed, said step of synchronizing including locking a rate at which said step of digitizing is performed to said frequency of said pilot tone.

27. The method as defined in claim 17 further comprising the step of synchronizing said step of digitizing said analog signal with said step of encoding said binary digital signals by extracting a tone inherent in said signals by conducting said signals through a non-linear function operator, said step of synchronizing including locking a rate at which said step of digitizing is performed to a frequency of said extracted tone.

28. The method as defined in claim 27 wherein said non-linear function operator comprises a squarer.

* * * * *